Aug. 5, 1952

H. E. CLARKE 2,605,548

HAND MEASURING DEVICE

Filed June 24, 1950

Inventor:
Harold E. Clarke, Deceased
Genevieve L. Clarke, Executrix
by Thomson & Thomson
Attorneys Aug. 5, 1952 H. E. CLARKE 2,605,548
HAND MEASURING DEVICE
Filed June 24, 1950 3 Sheets-Sheet 2

Inventor:
Harold E. Clarke, Deceased
Genevieve L. Clarke, Executrix
by Thomson & Thomson
Attorneys Aug. 5, 1952
H. E. CLARKE
2,605,548
HAND MEASURING DEVICE
Filed June 24, 1950
3 Sheets-Sheet 3
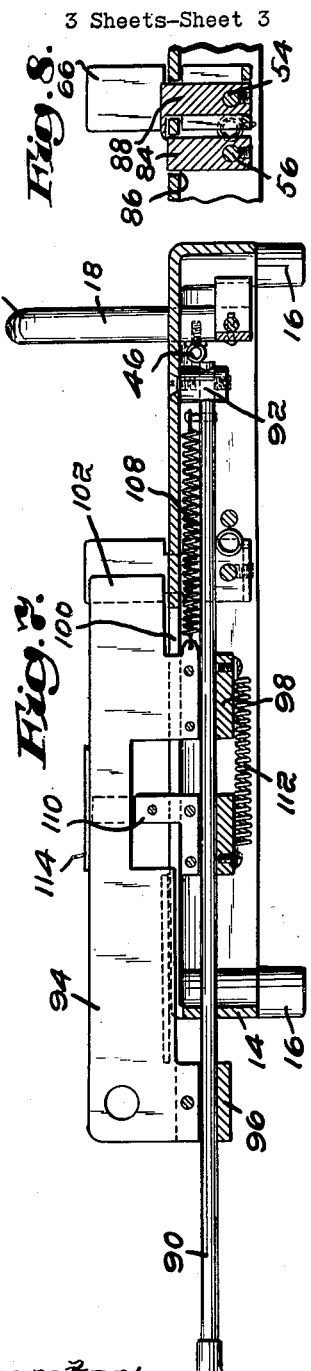
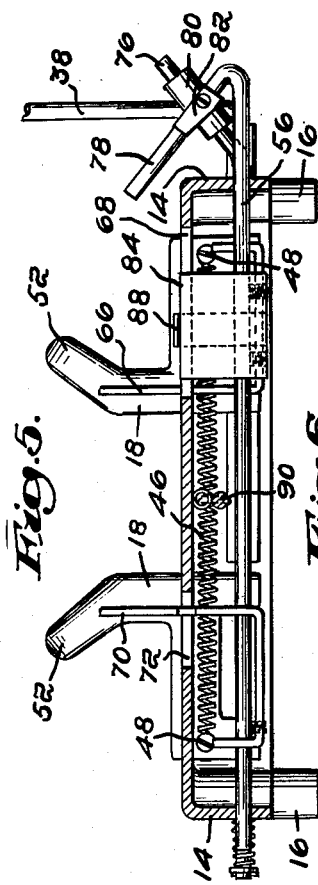
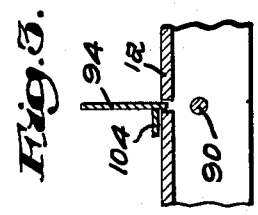
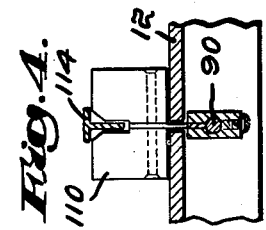
Inventor:
Harold E. Clarke, Deceased.
Genevieve L. Clarke, Executrix
by Thomson & Thomson
Attorneys Patented Aug. 5, 1952

2,605,548

UNITED STATES PATENT OFFICE 2,605,548

HAND MEASURING DEVICE

Harold E. Clarke, deceased, late of Somerville, Mass., by Genevieve L. Clarke, executrix, Nobleboro, Maine Application June 24, 1950, Serial No. 170,152

4 Claims. (Cl. 33—2)

This invention relates to improvements in a hand measuring machine to be used particularly in taking the hand measurements of men in order to fit the men for the proper size gloves.

It is an object of the invention to provide a machine for resiliently gripping the wrist of a hand between the wrist bone and the base of the hand and to provide means for indicating the width of the hand, the length of the body of the hand and the length of the middle finger.

Further objects and advantages of the improvements will be more readily apparent from the following description of a preferred embodiment thereof as disclosed in the attached drawings, in which:

Fig. 3 is a fragmentary vertical section taken on the plane indicated 3—3 in Fig. 1;

Fig. 4 is a fragmentary vertical section taken on the plane indicated 4—4 in Fig. 1;

Fig. 5 is a vertical section taken on the plane indicated 5—5 in Fig. 1;

Fig. 6 is a vertical section taken on the plane indicated 6—6 in Fig. 1;

Fig. 7 is a vertical section taken on the plane indicated 7—7 in Fig. 1; and

Fig. 8 is a fragmentary vertical section taken on the plane indicated 8—8 in Fig. 1.

Figure 1:
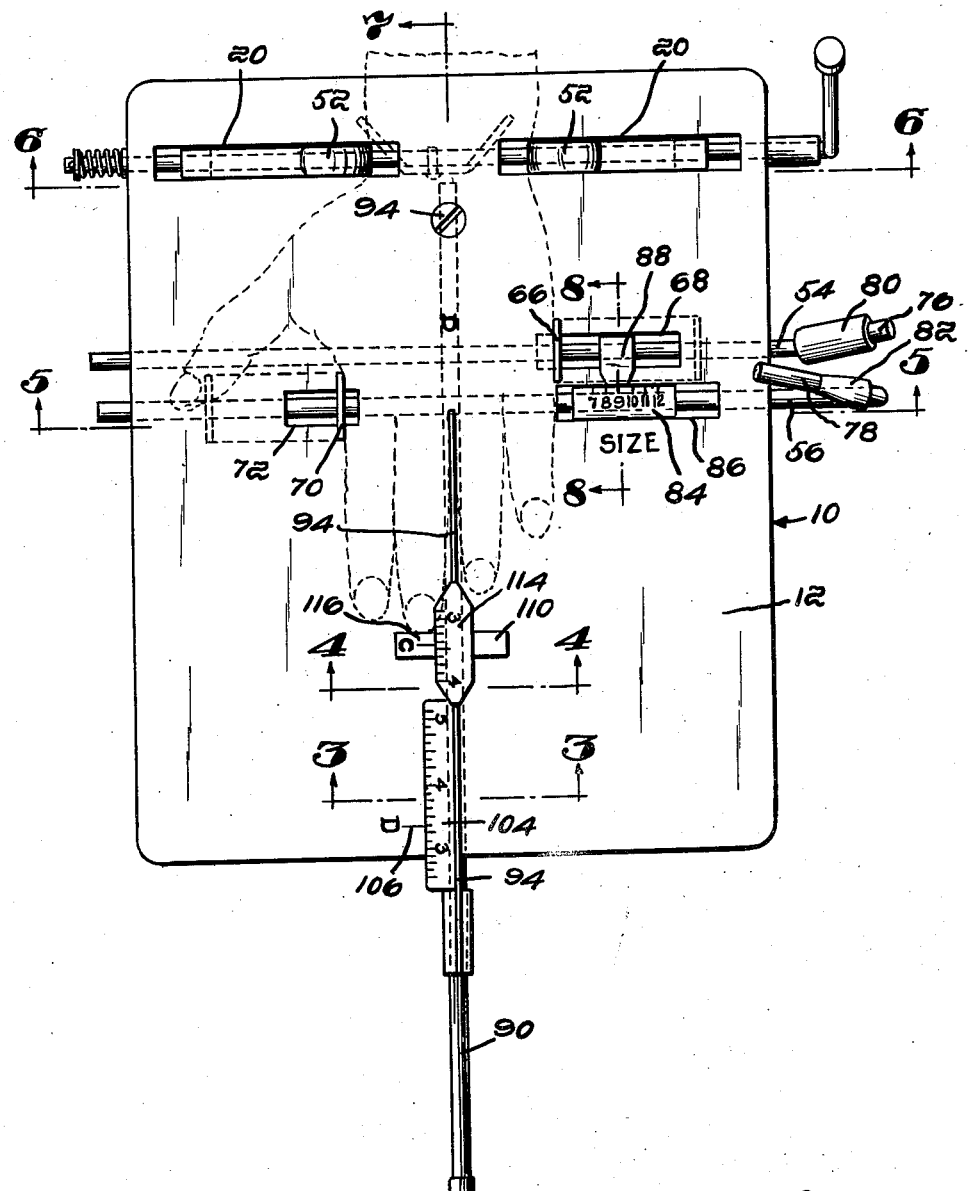
Fig. 1 is a plan view of the hand measuring machine showing a hand in dotted lines in position for reading the measurements.

The frame 10 forms the table 12 and has the flanged sides 14. The frame 10 is supported by the rubber feet 16 attached at the corners of the frame. A pair of gripping members 18 are provided to engage the hand at the base point from which the measurements are taken, which is between the base of the hand and the wrist bone. The members 18 are mounted to extend through the slots 20 cut in the table 12 and each of the members 18 are slidably mounted on a rod 22 through the bearings 24. The guide rod 22 is pivotally mounted in the flanged sides 14 of the frame at the bearing points 26 and 28, as shown in Fig. 6. A stop member 30 is fixed to the rod 22 to engage the side 14 of the frame, as shown in Fig. 6, and the other end of the rod 22 extends beyond the side 14 of the frame and a spring 32 is provided between the collar 34 and the collar 36 to resiliently hold the rod 22 in position. Beyond the stop 30, the rod 22 is formed into the lever arm 38. A cam member 40 is fixed to the rod 22, as shown in Fig. 2, and the cam 40 has the wing-shaped arms 42, each of which is adapted to engage the extensions 44 from the gripping member 18.

The gripping members 18 are normally urged to engage the cam member 40 through the action of the tension spring 46 fixed at 48 to the extensions 50 from the members 18. Turning of the shaft 22 by means of the lever arm 38 will serve to spread the gripping members to permit inserting the hand in position. The upper ends of the gripping members 18 may be spread apart, as indicated at 52 in Fig. 6. After the hand has been placed in position, the lever member 38 is turned back towards upright position which permits the gripping members 18 to engage the hand and hold it in position. The machine, as shown, is designed to take the measurements of the left hand only.

Figure 2:
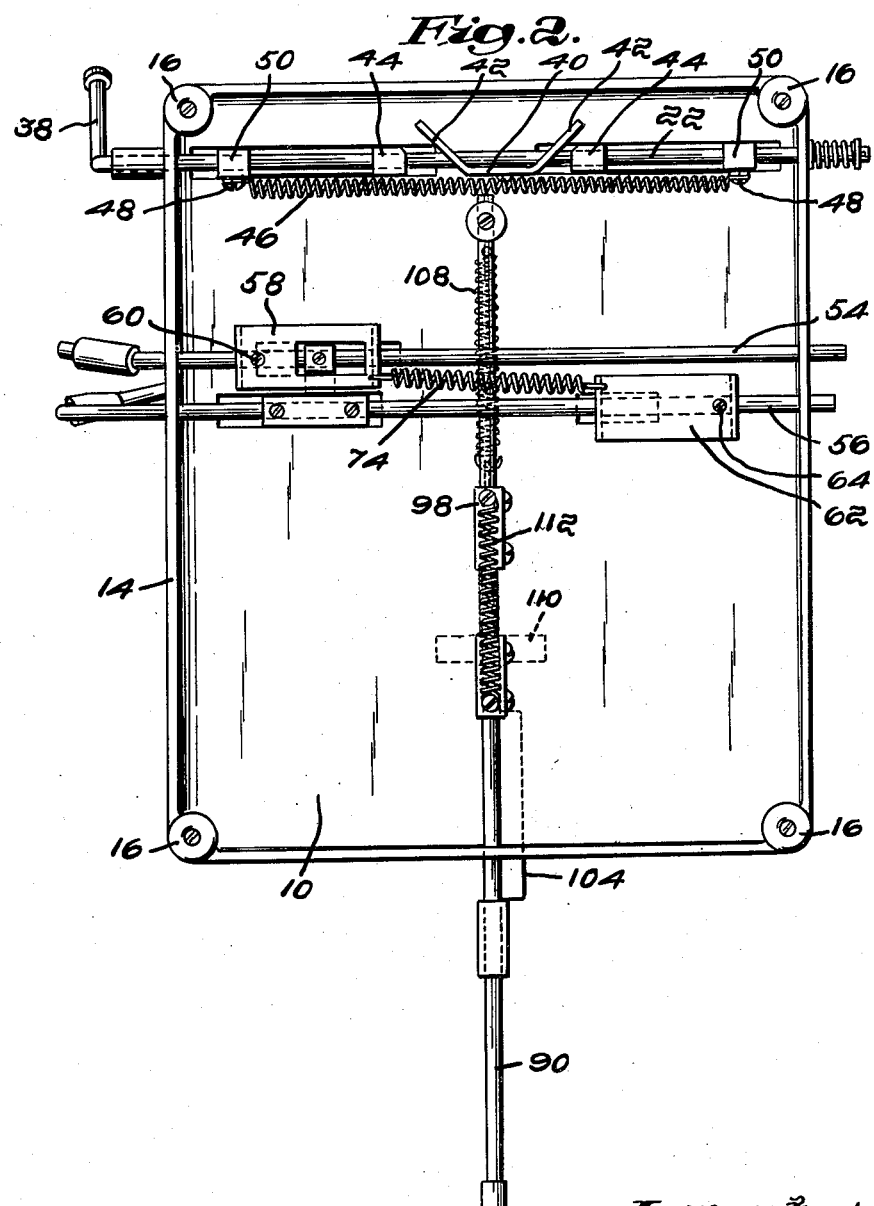
Fig. 2 is a bottom view of the machine shown in Fig. 1.

The slides 54 and 56 are mounted in the flanged sides 14 of the frame 10, as shown in Fig. 2. A metal strap member 58 is fixed to the slide 54 and is set in position by set screw 60, while a similar strap 62 is fixed to the slide 56 by the set screw 64. The member 58 has a side plate extension on the upper side of the table shown at 66 in Fig. 1. The side plate 66 is guided in its movement by the slot 68 which is formed in the table 12. The member 62, which is fixed to the slide 54, has a similar side plate 70 which extends through and is guided by the slot 72. These side plates 66 and 70 are adapted to engage the opposite sides of the hand, as shown in Fig. 1, and are resiliently held against the hands by means of a tension spring 74 which extends between the straps 58 and 62, as shown in Fig. 2.

The slides 54 and 56 extend beyond the side of the frame, as shown in Fig. 1, and are oppositely bent to provide the arms 76 and 78 on which are positioned the guide members 80 and 82, as shown in Fig. 1 and Fig. 2. These guide members 80 and 82 are positioned to be engaged by the lever arm 38 as it is moved downwardly. The slide members will be moved in opposite directions to separate the side members 66 and 70 and permit placing the hand in position on the table for taking measurement. When the lever is moved upwardly to vertical position, the side plates 66 and 70 are moved to engage the sides of the hand, as shown in Fig. 1. The slide 56 has a block 84 fixed thereto and extending through the block 86 on the table 12 and the block 84 may be marked with size measurements, as indicated in Fig. 1. An indicating block 88 is similarly fixed to the slide 54 and is formed to extend adjacent the block 86 which has the size markings. The width of the hand may be read from the relative position of the blocks 86 and 88.

The machine is further designed to take two length measurements. The guide rod 90 is fixed in position by the pin 92 which is attached to the underside of the frame by the screw 94. The other end of the guide rod 90 extends through the flanged side 14 of the frame and some distance beyond. The slide plate 94 is slidably mounted on the guide rod 90 through the bearings 96 and 98 and the plate 94 extends vertically through the slot 100 cut in the table. The inner end 102 of the plate 94 is adapted to engage the hand at the base between the second and third fingers, as shown in Fig. 1. The depth of the hand from the base point at the wrist to the base of the fingers is read from the relative position of the size plate 104 which is fixed to the vertical plate 94, as shown in Fig. 1, and the indicating line 106 marked on the table 12.

The plate 94 is normally held in retracted position to engage the hand by the spring 108. In addition, a finger plate 110 is provided slidably mounted on the guide rod 90 and adapted to engage the tip of the longest finger, as shown in Fig. 1. The plate 110 is held in retracted position by the spring 112, as shown in Fig. 7. A size indicating plate 114 is fixed to the top of the plate 94, as shown in Fig. 1, and the reading is taken from the indicating mark 116 on the finger member 110.

It is claimed:

1. In a machine for measuring a hand, a table on which the hand may be placed, resilient means for gripping the wrist between the wrist bone and the base of the hand, relatively movable members resiliently engaging the sides of the hand at the base of the fingers, means for indicating the width of the hand from the relative position of said members, a second pair of relatively movable members resiliently engaging the tip of the second finger and the hand at the base of said finger, and means for indicating the relative position of the second pair of members to read the length of the hand and the length of the finger.

2. In a machine for taking measurements of a hand, the table on which the hand may be placed, a pair of opposed gripping members adapted to engage the hand between the wrist bone and the base of the hand, resilient means normally holding said members in gripping position, a lever member movable to spread said gripping members apart to permit insertion of the hand, means for indicating the width of the hand and means for indicating the length of the hand and the length of the longest finger.

3. In a machine for automatically indicating measurements of a hand, a table on which the hand may be placed, a pair of relatively movable wrist gripping members, resilient means normally effective to move said gripping members to engage the wrist at the base of the hand, a pair of side plates, each of said side plates adapted to engage a side of the hand, resilient means normally effective to move said side members to engage the opposite sides of the hand, a pair of manually operated lever members, means operative by movement of one of said lever members to spread said wrist gripping members and means operative by movement of the other of said lever members to spread said side plates to permit placing of the hand on the table in position.

4. In a machine for taking hand measurements, a table on which the hand may be placed, means for fixing the position of the hand by engaging the wrist at the base of the hand, a slide member adapted to engage the hand at the base between the middle fingers, resilient means effective to move said slide member to engage the hand, means for indicating the relative position of said slide member with respect to said table to read the length of the hand, a finger-engaging plate relatively movable with respect to said slide member, means for moving said finger plate in a direction to engage the tip of the longest finger and means for indicating the relative position of said slide member and said finger plate to read the length of the finger.

GENEVIEVE L. CLARKE.
*Executrix of the Last Will and Testament of Harold E. Clarke, Deceased.*

REFERENCES CITED

The following references are of record in the file of this patent:

UNITED STATES PATENTS

| Number | Name | Date |
|---|---|---|
| 1,582,636 | Clarke | Apr. 27, 1926 |
| 1,792,892 | Cobb | Feb. 17, 1931 |
| 1,997,920 | Bliss | Apr. 16, 1935 |
| 2,146,799 | Davis | Feb. 14, 1939 |
| 2,176,288 | Baird | Oct. 17, 1939 |
| 2,394,149 | Clarke | Feb. 5, 1946 |

FOREIGN PATENTS

| Number | Country | Date |
|---|---|---|
| 288,221 | Germany | Oct. 25, 1915 |